(12) United States Patent
Lecky

(10) Patent No.: US 9,298,997 B1
(45) Date of Patent: Mar. 29, 2016

(54) SIGNATURE-GUIDED CHARACTER RECOGNITION

(71) Applicant: Amazon Technologies, Inc., Reno, NV (US)

(72) Inventor: Ned Lecky, Vashon, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/219,438

(22) Filed: Mar. 19, 2014

(51) Int. Cl.
*G06K 9/46* (2006.01)
*G06K 9/62* (2006.01)
*G06K 9/18* (2006.01)

(52) U.S. Cl.
CPC ........................................ *G06K 9/18* (2013.01)

(58) Field of Classification Search
None
See application file for complete search history.

(56) References Cited

U.S. PATENT DOCUMENTS

| | | | | |
|---|---|---|---|---|
| 5,199,084 A | * | 3/1993 | Kishi et al. | 382/292 |
| 5,617,481 A | * | 4/1997 | Nakamura | 382/101 |
| 6,360,001 B1 | * | 3/2002 | Berger et al. | 382/101 |
| 2007/0242882 A1 | * | 10/2007 | Chiba et al. | 382/173 |
| 2014/0279323 A1 | * | 9/2014 | Kliatskine et al. | 705/34 |

FOREIGN PATENT DOCUMENTS

JP 2004321974 A * 11/2004 ............... B07C 3/14

OTHER PUBLICATIONS

Machine Translation of JP 2004321974, published Nov. 2004, to Sakuragi et al., 12 pages total.*

* cited by examiner

*Primary Examiner* — Brian P Werner
(74) *Attorney, Agent, or Firm* — Athorus PLLC

(57) ABSTRACT

Where the recognition of small characters (e.g., text, numbers or symbols) expressed in substantially large images is desired, the recognition process may be facilitated by identifying a signature or a pattern of marked identifiers (e.g., bar codes) within the image, and determining where such characters are typically located in relation to the signature or pattern of identifiers. Because the recognition of characters within images typically occupies a substantial amount of a computer's processing capacity, focusing a recognition technique on portions where such characters are frequently located within an image that includes the signature or pattern, and not on the entire image, the time required in order to process an image in order to recognize such characters may be markedly reduced.

21 Claims, 8 Drawing Sheets

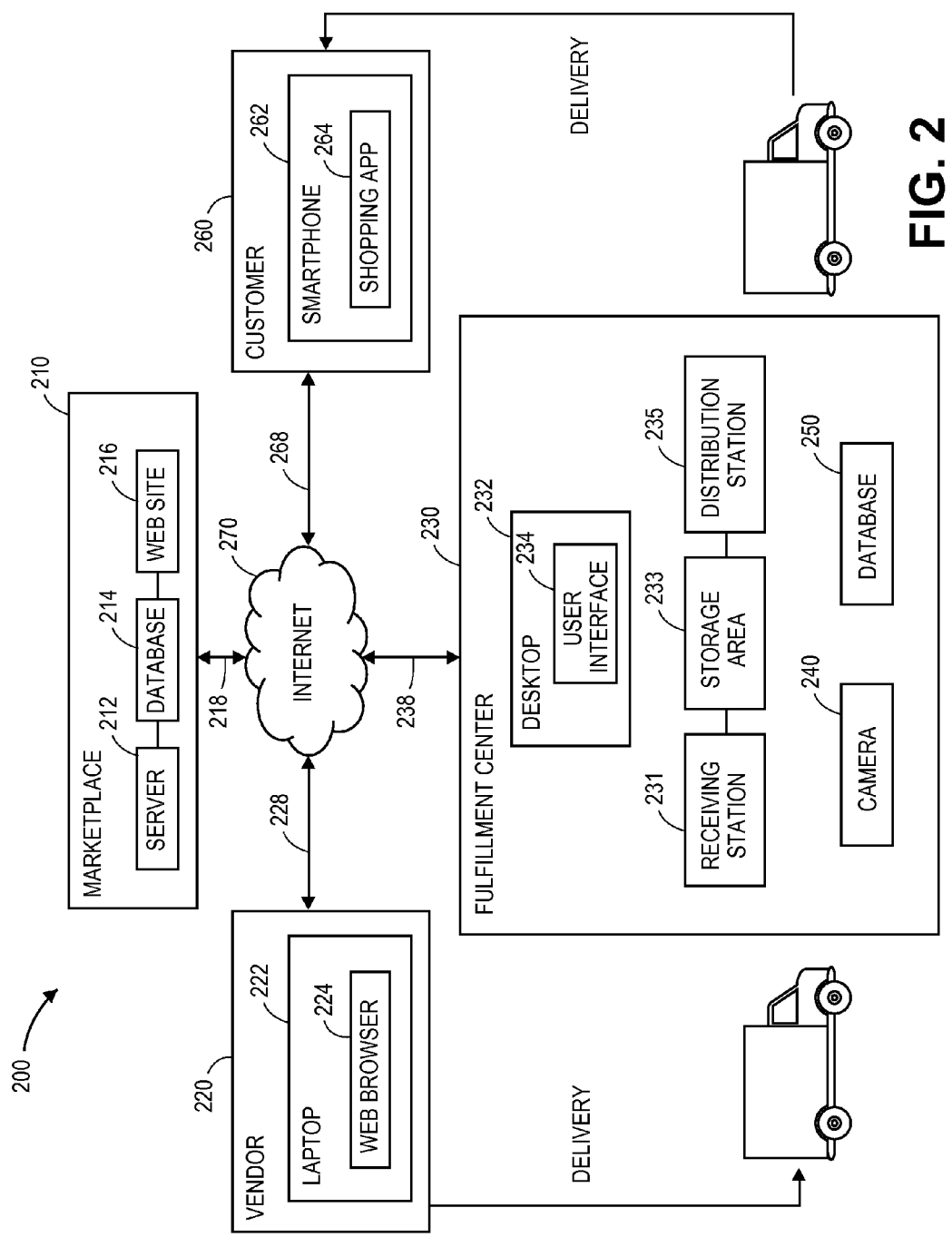

SIGNATURE-GUIDED CHARACTER RECOGNITION

BACKGROUND

Letters, parcels or packages are frequently delivered in containers having one or more standard labels that are applied, affixed or otherwise disposed thereon. Such labels may typically include bar codes or other one-dimensional or two-dimensional coded representations of data, along with sets of alphanumeric characters including text or numbers associated with one or more contents of the container, an originating sender or an intended recipient. When a container bearing a label with one or more bar codes and sets of alphanumeric characters arrives at a location such as a storage facility, a distribution facility or a fulfillment center, the bar codes and the alphanumeric characters may be read or otherwise interpreted by one or more automatic means.

Bar codes that are included in a label applied to a container may be interpreted relatively easily by applying or focusing a standard scanner or reader onto the bar codes, or by capturing one or more images of the bar codes, and evaluating the images to determine locations and orientations of the bar codes within such images, or to recognize the data encoded in the bar codes. Alphanumeric characters that are included in the label, however, may be interpreted according to one or more optical character recognition (or "OCR") techniques that may be relatively cumbersome. For example, in order to read or otherwise interpret text, numbers or other characters that are shown in an image, the image typically must be processed in order to locate and interpret the characters within the image. In particular, the task of locating the characters within an image to be interpreted is frequently the most challenging aspect encountered during an OCR process. In order to ensure that all relevant text, numbers or other characters represented within an image are interpreted, the OCR process typically must evaluate the entire image. Where the characters to be interpreted are small in size, or the images in which such characters are included are large, the processing of such images may consume a great deal of a computer's processing capacity and take several minutes for each image.

BRIEF DESCRIPTION OF THE DRAWINGS

FIG. 2 is a block diagram of components of one system for signature-guided character recognition, in accordance with embodiments of the present disclosure.

DETAILED DESCRIPTION

Figure 1A:
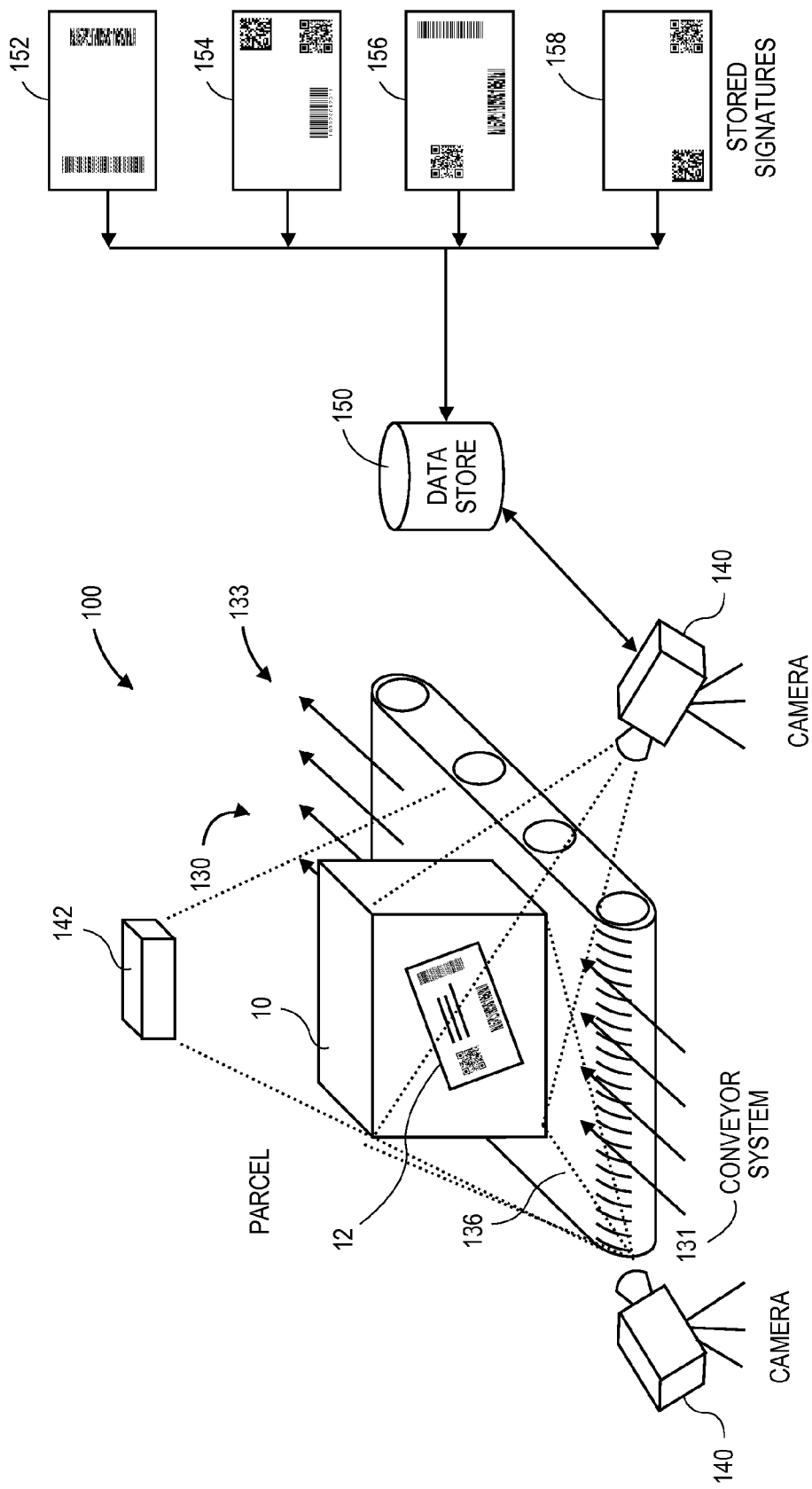
FIGS. 1A and 1B are views of components of one system for signature-guided character recognition, in accordance with embodiments of the present disclosure.

As is set forth in greater detail below, the present disclosure is directed to the recognition of characters (e.g., text, numbers or symbols) based on observed signatures or patterns of identifiers on labels. Specifically, some embodiments of the systems and methods disclosed herein are directed to capturing one or more images of a first object, and evaluating the first object in order to locate one or more identifiers (e.g., sets of other text, numbers or symbols of various fonts or sizes, as well as bar codes) thereon, which may be located within a label or other material disposed thereon. Once the identifiers have been located within such images, the images may be evaluated in order to interpret the identifiers, and to determine positions and orientations of such identifiers on the first object. A signature of the identifiers on the first object may be defined based at least in part on the positions or orientations of the interpreted identifiers, and the signature may then be compared to information regarding previously observed signatures of identifiers on other objects, which may be stored in one or more data stores along with references to portions of such objects where recognizable characters may be found.

If the signature of the identifiers on the first object is consistent with one of the previously observed signatures of identifiers on other objects, then information regarding the locations of recognizable characters on such objects may act as a guide for locating recognizable characters in corresponding locations on the first object, and the corresponding locations on the first object may be evaluated according to one or more optical character recognition ("OCR") techniques. For example, where a signature of identifiers is recognized in an image, locations of essential information regarding an object within the image may be identified and the essential information interpreted, thereby enabling an OCR system or process to ignore not only the remaining portions of the image of the object, but also any and all other images of the object, in order to efficiently recognize the essential information.

If the signature of the identifiers on the first object is not consistent with any of the previously observed signatures of identifiers on other objects, however, then the images of the first object may be manually or automatically evaluated in order to locate and evaluate any relevant characters thereon according to one or more OCR techniques. For example, the images may be evaluated in their entirety, and in a serial order (e.g., top-to-bottom, or left-to-right). Alternatively, the images may be evaluated beginning first with portions or sectors of such images that are deemed most likely to include, or have the highest probability of including, one or more relevant characters therein, e.g., according to one or more text detection or localization algorithms or techniques. Once such characters have been located, the signature of the identifiers may be stored in association with the locations of such characters in the one or more data stores.

Figure 1B:
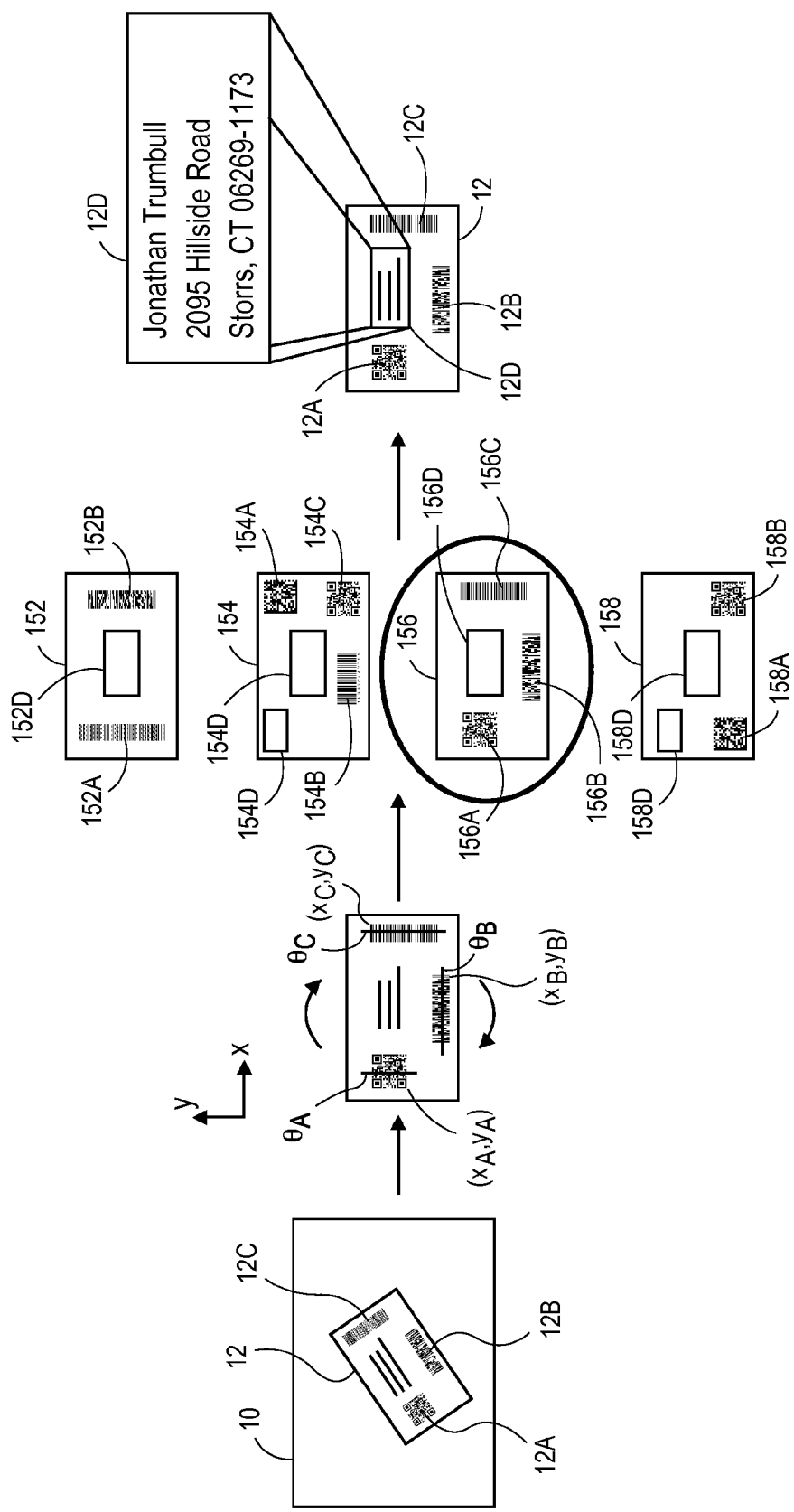

Referring to FIGS. 1A and 1B, views of components of one system for signature-guided character recognition are shown. Referring to FIG. 1A, a system 100 includes an item 10, a conveyor system 136, a plurality of cameras 140, an orientation sensor 142 and a data store 150. The item 10 includes a label 12 disposed thereon, and is shown as traveling between an origin 131 and a destination 133 on the conveyor system 136, e.g., a conveyor belt. The cameras 140 are in communication with the data store 150, and are aligned to capture images of a surface or face of the item 10 that includes the label 12. Images of the item 10 captured using the cameras 140 may be subsequently processed in order to recognize any colors, textures or outlines of the item 10, as well as to interpret any markings, labels or other identifiers disposed on the item 10. The orientation sensor 142 is positioned to determine ranges to and orientations of items traveling along the conveyor 136. Such ranges or orientations may be defined or measured with regard to any standard, such as a distance from the orientation sensor 142 to the item 10, or a net distance calculated from any baseline or benchmark. The data store 150 includes information regarding a plurality of signatures 152, 154, 156, 158.

Referring to FIG. 1B, one example of the functionality of the system 100 of FIG. 1A is shown. As is shown in FIG. 1B, the image of the item 10 shows the label 12, which includes an identifier 12A in the form of a two-dimensional QR bar code, and identifiers 12B, 12C in the form of one-dimensional bar codes. According to some embodiments of the present disclosure, the portion of the image of the item 10 corresponding to the label 12 may be rotated, and the positions $(x_i, y_i)$ and angles of orientation $\theta_i$ of the identifiers 12A, 12B, 12C on the label 12 may be determined. For example, as is shown in FIG. 1B, the position $(x_A, y_A)$ and angle of orientation $\theta_A$ of the identifier 12A along a left side of the label 12, as well as the position $(x_B, y_B)$ and angle of orientation $\theta_B$ of the identifier 12B along a bottom portion of the label 12, and the position $(x_C, y_C)$ and angle of orientation $\theta_C$ of the identifier 12C along a right side of the label 12, may be determined.

Next, a signature may be defined by the positions $(x_i, y_i)$ and angles of orientation $\theta_i$ of the identifiers 12A, 12B, 12C on the label 12, and the signature may be compared to the signatures 152, 154, 156, 158 stored in the data store 150. As is shown in FIG. 1B, the signature 152 includes a one-dimensional bar code 152A vertically aligned along a left side and a one-dimensional bar code 152B vertically aligned along a right side, as well as a defined text region 152D in a center of the signature 152. The signature 154 includes a two-dimensional bar code 154A in an upper right corner, a one-dimensional bar code 154B horizontally aligned along a bottom portion and a two-dimensional bar code 154C in a lower right corner with defined text regions 154D in an upper left corner and in a center of the signature 154, while the signature 156 includes a two-dimensional bar code 156A along a left side, a one-dimensional bar code 156B horizontally aligned along a bottom portion and a one-dimensional bar code 156C vertically aligned along a right side, with a defined text region 156D in a center of the signature 156. Finally, the signature 158 includes a two-dimensional bar code 158A in a lower right corner, a two-dimensional bar code 158B in a lower right corner, and defined text regions 158D in an upper left corner and in a center of the signature 158.

Once the signature defined by the positions $(x_i, y_i)$ and angles of orientation $\theta_i$ of the identifiers 12A, 12B, 12C on the label 12 is determined to be consistent with the signature 156, a portion 12D of the label 12 corresponding to the defined text region 156D of the signature 156 may be evaluated in order to recognize any characters set forth therein. Had the signature defined by the positions $(x_i, y_i)$ and angles of orientation $\theta_i$ of the identifiers 12A, 12B, 12C on the label 12 not been determined to be consistent with any of the signatures 152, 154, 156, 158 stored in the data store 150, however, the label 12 would have been manually or automatically evaluated in order to identify the text in the portion 12D (e.g., by evaluating portions of the label 12 in a random order, or beginning with portions having the highest probability of including characters set forth therein, until the portion 12D was located, according to a text detection or localization algorithm), and an association between the signature and the portion 12D would have been stored in the data store.

Accordingly, upon identifying locations and orientations of any number or type of identifiers (e.g., text, numbers, symbols or bar codes) expressed within a selected image, and generating a signature based on the locations and orientations of the identifiers, the signature may be compared to signatures that were previously generated based on locations and orientations of identifiers in other images and stored in a data store along with information regarding locations of recognizable characters (e.g., other text, numbers or symbols) within such other images. For example, a data file or data record containing information regarding the locations and/or orientations of identifiers within the selected image may be generated, and compared to a plurality of data files or data records containing information regarding not only the locations and/or orientations of identifiers within previously generated signatures but also corresponding locations of recognizable characters associated with such signatures.

If the generated signature corresponds to one of the previously generated signatures, then the systems and methods of the present disclosure may evaluate locations of the selected image corresponding to the locations of recognizable characters within the other images. If the generated signature does not correspond to any of the previously generated signatures, however, the selected image may be evaluated in its entirety in order to locate and interpret any recognizable characters therein. Furthermore, portions of the selected image may be evaluated in series, or at random, or beginning first with portions of the selected image that are deemed to have the highest probability of including recognizable characters therein, which may be determined based at least in part on prior experiences with one or more of the identifiers included in the generated signature, or on any other factor. Once such characters are located, information regarding the signature and the locations of the recognizable characters therein may be stored in at least one data store, and compared to signatures that are generated based on locations and orientations of identifiers in the future.

A typical fulfillment center, such as those that are associated with modern online marketplaces, may be configured to receive, store and/or distribute hundreds of thousands, or even millions, of items at any given time. For example, when an item arrives at a receiving station associated with a fulfillment center, the item may be removed from a container and transported to an assigned storage facility within the fulfillment center (e.g., a shelf, bin, rack, tier, bar, hook or other storage means) by a conveying system, such as a conveyor belt. Likewise, when an order for the item is received from a customer, the item may be retrieved from the assigned storage facility, and transported to a distribution station by way of the conveying system, and prepared for delivery to the customer. Alternatively, where an order for an item has been received from a customer by the time the item arrives at the fulfillment center, the item may be transported directly from the receiving station to the distribution station, or "cross-docked," for prompt delivery to the customer. As the item travels through various aspects of the fulfillment center, one or more images of the Frequently in a fulfillment center, an item or a container may have one or more labels (e.g., shipping labels, address labels, security labels or any other kind or type of label) applied thereto. Such labels may include information regarding the item or the container, an origin or a destination for the item or the container, or an order with which the item or the container is associated. Typically, the labels may include or display information or data using identifiers as well as alphanumeric characters or symbols. Some identifiers may include one-dimensional bar codes, two-dimensional bar codes, bokodes or any other form of coded representations of information or data. Some common one-dimensional bar codes include Code 39 codes, Extended Code 39 codes, Code 128 Codes, UCC/European Article Numbering (or "EAN") 128 codes, Universal Product Code (or "UPC") A or E codes, EAN13 or EAN8 codes, Interleaved (or "ITF") codes, Coda- Bar codes, Code 11 codes, Code 93 codes, GS1 DataBar codes, GS1 DataBar Expanded codes, GS1 DataBar Limited codes, GS1 DataBar Coupon codes, DataBar Omni-Directional Stacked or Truncated codes, MSI Plessey codes, POSTNET codes, PLANET codes or OneCode codes. Some common two-dimensional bar codes include PDF417 codes, Data Matrix codes, MaxiCode codes, Aztec codes or QR codes. Additionally, some identifiers may also include other alphanumeric characters or symbols.

Labels are frequently applied to items for the purpose of identifying the items in transit. For example, where an item is to be delivered to a customer by way of a common carrier, the common carrier may require a label that includes one or more optically readable bar codes and sets of alphanumeric characters identifying a sender and a recipient to be applied to the item or a container in which the item is to be delivered. Moreover, the labels that are typically required by most common carriers are usually of a standard size or form, including defined regions for bar codes and characters that are consistently provided in each label.

Electronically interpreting a bar code that includes an encoded representation of data and is disposed upon an item or a container is a relatively standard evolution. For example, a standard bar code reader may include a light source for transmitting light beams or other optical impulses upon a bar code, and a light sensor for capturing light reflected from the bar code, and for converting the reflected light into one or more electrical signals that may be evaluated in order to decode the data. Such readers may typically take the form of pen-like or other handheld devices. Alternatively, one or more digital images of surfaces of the container including the bar code may be captured and processed in order to recognize and interpret the bar code through one or more photogrammetric analyses. For example, in a fulfillment center environment, a series of images may be captured of one or more surfaces or faces of the item, including a surface or face of the item bearing the bar code, which may be identified within such images, and interpreted based on the corresponding portions of white or light colored (i.e., reflective) markings and black or dark-colored (i.e., absorptive) markings of the bar code. When interpreting a bar code expressed in an image, information including not only the coded data represented in the bar code but also a location of the bar code within the image, i.e., which may be expressed according to one or more coordinate systems, and an angle of orientation of the bar code within the image, may be determined using one or more bar code readers or imaging systems.

Electronically recognizing alphanumeric characters such as text or numbers according to automatic OCR techniques is substantially more complicated than interpreting a bar code, however. First, according to some OCR techniques, an image including the alphanumeric characters must be obtained in a suitable and recognizable format (e.g., from a source such as a digital camera). Next, the image may be processed by skewing the content into a readable orientation, and enhancing the expressed data in order to improve the quality of the text or numbers shown therein and also to remove any imaging noise. Where necessary, the image may be converted or binarized from a multi-color format to a two-toned image (e.g., black-and-white). Next, lines or other stray marks may be filtered and removed from the image, and the positions of regions having alphanumeric characters within the image must be determined. Once the regions of characters have been located, a set of the various characters within such regions may be recognized, with the assistance of dictionaries or other resources that may be helpful in resolving evaluations of similar characters (e.g., choosing between the number "1" or the letter "l," or between the letter "S" or the symbol "$"), and the recognized set of characters may be stored in at least one data store.

Interpreting characters within an image using automatic OCR techniques requires an extensive amount of computer processing power, especially where the images are sufficiently large, and where the text, numbers or symbols therein are small. Because high-resolution images of standard-sized items (e.g., having dimensions of up to two to three feet) may be as large as dozens or hundreds of megabytes, and because labels affixed to such images may include text having sizes as small as nine point font (or one-eighth of an inch), the computer-based interpretation of characters expressed in a single image according to one or more OCR techniques may take several minutes or longer to complete. Frequently, the task of locating characters within such large images is the most time-consuming and computationally taxing aspect of an OCR technique.

The systems and methods of the present disclosure are directed to identifying the locations and orientations of various types of bar codes or other coded representations within an image of an item, and defining a signature based on information regarding the locations and orientations of such bar codes within the image. Where an image of the item is captured from a specific perspective, an orientation of the object within the image may be determined based on any available information, e.g., information captured using the orientation sensor 142 of FIG. 1A. Alternatively, an orientation of the object within the image may be determined by processing the image according to one or more algorithms or techniques, such one or more affine transformations or matrix analyses, in order to clarify the representations of identifiers with respect to one another as expressed therein, and more accurately define a signature based on such identifiers. Those of ordinary skill in the pertinent art will recognize that a signature may be defined based on identifiers that are located on multiple surfaces or faces of an object, e.g., identifiers on two or more sides of the object. For example, a box may include a company name on one side, and a bar code or serial number (e.g., a Stock Keeping Unit, or SKU) on another side, as well as substantially small text and/or numbers on yet another side. Therefore, a signature may be defined by a large set of text on a first side, and a bar code and/or serial number on a second side. Where the signature is subsequently identified on another box, the systems and methods may evaluate a location consistent with the location of the substantially small text and/or numbers on a third side of the box.

The signature, or a data file or data record representative of the signature, may then be compared to a database or registry that includes one or more other signatures, or data files or data records representative of bar codes defined from other images of other items, as well as information regarding locations of recognizable characters within such other images. If the signature corresponds to one of the other signatures in the database or registry, then the systems and methods of the present disclosure may evaluate the portions of the image of the item corresponding to the locations of recognizable characters within such other images.

The database or registry may be preloaded with information regarding signatures and corresponding locations of characters, or may acquire such information by manual or automatic means. For example, the signatures of bar codes, characters or other identifiers on a plurality of standard labels, and locations of particular text, numbers or symbols within such labels, may be uploaded to the database or registry by any wired or wireless means. Additionally, a signature of identifiers on a label may be manually defined, and the locations of characters within the label may be manually identified. Alternatively, the locations and orientations of identifiers within an image of a label may be automatically determined through a photogrammetric analysis of the image, and the locations of characters within the label may be determined using one or more OCR techniques. A signature may be defined based at least in part on the locations and orientations of the identifiers, and an association between the signature and the locations of characters within the label may be stored in at least one data store. For example, a signature may be defined based on locations and/or orientations of characters of a first font or size (e.g., larger characters), and the signature may be interpreted and used to identify locations of characters of a second font or size (e.g., smaller characters) expressed within discrete portions of an image of an object or a label applied thereon.

The systems and methods of the present disclosure may be used in any application in which labels having identifiers (e.g., bar codes or characters) and sets of text, numbers and/or symbols are applied, affixed or otherwise disposed on objects. For example, in a fulfillment center environment, such systems and methods may be particularly useful in processing not only inbound shipments but also outbound shipments. With regard to inbound processing, the present disclosure may be directed to interpreting labels that are printed and applied to items or containers by vendors, sellers or manufacturers delivering items to the fulfillment center for subsequent distribution to customers, or by customers returning items to the fulfillment center. The systems and methods disclosed herein may capture one or more images of surfaces of the items or containers using one or more imaging devices (e.g., digital cameras), locate and interpret identifiers thereon, generate signatures based on such identifiers, such as by determining an alignment or orientation of the items or any markings thereon as shown in such images, and compare such signatures to other previously generated signatures in order to facilitate the interpretation of any text, numbers or symbols represented therein. With regard to outbound processing, the present disclosure may be used in quality control, i.e., by interpreting labels that are printed and applied to items or containers within a fulfillment center prior to their departure, in order to confirm that the characters shown therein are sufficiently clear and legible.

Referring to FIG. 2, a block diagram of one system 200 for automatic visual fact extraction is shown. The system 200 includes a marketplace 210, a vendor 220, a fulfillment center 230 and a customer 260 that are connected to one another across a network 270, such as the Internet.

The marketplace 210 may be any entity or individual that wishes to make items from a variety of sources available for download, purchase, rent, lease or borrowing by customers using a networked computer infrastructure, including one or more physical computer servers 212 and databases 214 for hosting a web site 216. The marketplace 210 may be physically or virtually associated with one or more storage or distribution facilities, such as the fulfillment center 230. The web site 216 may be implemented using the one or more servers 212, which connect or otherwise communicate with the one or more databases 214 as well as the network 270, as indicated by line 218, through the sending and receiving of digital data. Moreover, the database 214 may include any type of information regarding items that have been made available for sale through the marketplace 210, or ordered by customers from the marketplace 210.

The vendor 220 may be any entity or individual that wishes to make one or more items available to customers, such as the customer 260, by way of the marketplace 210. The vendor 220 may operate one or more order processing and/or communication systems using a computing device such as a laptop computer 222 and/or software applications such as a web browser 224, which may be implemented through one or more computing machines that may be connected to the network 270, as is indicated by line 228, in order to transmit or receive information regarding one or more items to be made available at the marketplace 210, in the form of digital or analog data, or for any other purpose.

The vendor 220 may deliver one or more items to one or more designated facilities maintained by or on behalf of the marketplace 210, such as the fulfillment center 230. Additionally, the vendor 220 may receive one or more items from other vendors, manufacturers or sellers (not shown), and may deliver one or more of such items to locations designated by the marketplace 210, such as the fulfillment center 230, for fulfillment and distribution to customers. Furthermore, the vendor 220 may perform multiple functions. For example, the vendor 220 may also be a manufacturer and/or a seller of one or more other items, and may offer items for purchase by customers at venues (not shown) other than the marketplace 210. Additionally, items that are made available at the marketplace 210 or ordered therefrom by customers may be made by or obtained from one or more third party sources, other than the vendor 220, or from any other source (not shown). Moreover, the marketplace 210 itself may be a vendor, a seller or a manufacturer.

The fulfillment center 230 may be any facility that is adapted to receive, store, process and/or distribute items. As is shown in FIG. 2, the fulfillment center 230 includes a desktop computer 232, as well as stations for receiving, storing and distributing items to customers, including but not limited to a receiving station 231, a storage area 233 and a distribution station 235. As is also shown in FIG. 2, the fulfillment center 230 further includes a camera 240 and a database 250.

The fulfillment center 230 may operate one or more order processing and/or communication systems using a computing device such as the desktop computer 232 and/or software applications having one or more user interfaces 234 (e.g., a browser), or through one or more other computing devices or machines that may be connected to the network 270, as is indicated by line 238, in order to transmit or receive information in the form of digital or analog data, or for any other purpose. The computer 232 may also operate or provide access to one or more reporting systems for receiving or displaying information or data regarding workflow operations, and may provide one or more interfaces, such as the user interface 234, for receiving interactions (e.g., text, numeric entries or selections) from one or more operators, users or workers in response to such information or data. The computer 232 may be a general purpose device or machine, or a dedicated device or machine that features any form of input and/or output peripherals such as scanners, readers, keyboards, keypads, touchscreens or like devices, and may further operate or provide access to one or more engines for analyzing the information or data regarding the workflow operations, or the interactions received from the one or more operators, users or workers.

The receiving station 231 may include any apparatuses that may be required in order to receive shipments of items at the fulfillment center 230 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The storage area 233 may include one or more predefined two-dimensional or three-dimensional spaces for accommodating items and/or containers of such items, such as aisles, rows, bays, shelves, slots, bins, racks, tiers, bars, hooks, cubbies or other like storage means, or any other appropriate regions or stations. The distribution station 235 may include one or more regions or stations where items that have been retrieved from a designated storage area may be evaluated, prepared and packed for delivery from the fulfillment center 230 to addresses, locations or destinations specified by customers, also by way of carriers such as cars, trucks, trailers, freight cars, container ships or cargo aircraft (e.g., manned aircraft or unmanned aircraft, such as drones). Those of ordinary skill in the pertinent art will recognize that shipments of items arriving at the receiving station 231 may be processed, and the items placed into storage within the storage areas 233 or, alternatively, transferred directly to the distribution station 235, or "cross-docked," for prompt delivery to one or more customers.

The fulfillment center 230 may further include one or more control systems that may generate instructions for conducting operations at one or more of the receiving station 231, the storage area 233 or the distribution station 235. Such control systems may be associated with the computer 232 or with one or more other computing devices or machines, and may communicate with such devices or machines by any known wired or wireless means, or with the marketplace 210, the vendor 220 or the customer 260 over the network 270, as indicated by line 238, through the sending and receiving of digital data.

Additionally, the fulfillment center 230 may include one or more systems or devices (not shown in FIG. 2) for determining a location of one or more elements therein, such as cameras or other image recording devices. Furthermore, the fulfillment center 230 may also include one or more workers or staff members, who may handle or transport items within the fulfillment center 230. Such workers may operate one or more computing devices or machines for registering the receipt, retrieval, transportation or storage of items within the fulfillment center, such as the computer 232, or a general purpose device such a personal digital assistant, a digital media player, a smartphone, a tablet computer, a desktop computer or a laptop computer, and may include any form of input and/or output peripherals such as scanners, readers, keyboards, keypads, touchscreens or like devices.

The camera 240 may be any form of imaging sensor or optical recording device that may be used to photograph or otherwise record images of items or containers of items within the fulfillment center 230, or for any other purpose. The camera 240 may be configured to capture one or more still or moving images, as well as any relevant audio signals or other information, within one or more designated locations within the fulfillment center 230. The camera 240 may be configured to communicate with the computer 232, the database 250 or any control systems associated with the fulfillment center 230, as well as the server 212, the processor 214 or the web site 216, or to access one or more other computer devices by way of the network 270. Although the system 100 of FIG. 1 includes a plurality of cameras 140, and the fulfillment center 230 of FIG. 2 includes a single camera 240, the systems and methods of the present disclosure are not so limited, and may include any number or type of cameras or imaging sensors in accordance with the present disclosure.

The camera 240 may be configured to analyze one or more images, either alone or in conjunction with one or more other computing devices, such as the computer 232, according to any number of means, methods or techniques. For example, colors of pixels, or of groups of pixels, in a digital image may be determined and quantified according to one or more standards, e.g., the RGB ("red-green-blue") color model, a hexadecimal model, or according to any other model or format. Moreover, textures of features or objects expressed in a digital image may be identified using one or more computer-based visual analyses (e.g., a colorimetric analysis), algorithms or machine-learning tools, such as by identifying changes in intensities within regions or sectors of the image, or by defining areas of the image which correspond to specific surfaces. Furthermore, outlines of objects may be identified in a digital image according to any number of visual analyses, algorithms or machine-learning tools, such as by recognizing edges, contours or outlines of objects in the image, or of portions of objects, and by matching the edges, contours or outlines of the objects in the image against a database containing information regarding edges, contours or outlines of known objects. Those of ordinary skill in the pertinent arts would recognize that the systems and methods disclosed herein are not limited to any one means or method for generating images, or for gathering information from such images, in accordance with the present disclosure.

Moreover, images captured by the camera 240 may be processed according to one or more analytical functions or techniques, including pattern recognition, classification, segmentation or registration techniques, which may be applied in order to classify the content of such images according to data regarding colors, contrasts, areas or shapes. Some such computer-based machine-learning tools that may be used to analyze digital images captured by the camera 240 include statistical methods, artificial neural networks, K-means clustering, latent Dirichlet allocations, Bayesian classifiers, sparse dictionary learning techniques, which may be applied to such images in order to detect and recognize the contents thereof, in accordance with the present disclosure.

The database 250 may be any form of data store, including but not limited to a relational database or an object-oriented database, that may be accessible to the computer 232 and/or the camera 240 within the fulfillment center 230, as well as the marketplace 210, the vendor 220 or the customer 260. The database 250 may comprise a plurality of organized sets or collections of data relating to operations of the fulfillment center 230, including but not limited to signatures of identifiers, such as bar codes or characters, that may be derived or otherwise generated from one or more images, as well as locations of text, numbers, symbols or other characters that may be stored in association with the corresponding signatures of identifiers. The database 250 may include or comprise one or more drives, servers or machine-readable media devices for storing information or data.

The customer 260 may be any entity or individual that wishes to download, purchase, rent, lease, borrow or otherwise obtain items (which may include goods, products, services or information of any type or form) from the marketplace 210. The customer 260 may utilize one or more computing devices, such as a smartphone 262 or any other like machine that may operate or access one or more software applications, such as a web browser (not shown) or a shopping application 264, and may be connected to or otherwise communicate with the marketplace 210, the vendor 220 or the fulfillment center 230 through the network 270, as indicated by line 268, by the transmission and receipt of digital data. Moreover, the customer 260 may also receive deliveries or shipments of one or items from facilities maintained by or on behalf of the marketplace 210, such as the fulfillment center 230, or from the vendor 220.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "marketplace," a "vendor," a "fulfillment center" or a "customer," or like terms, may be automated steps performed by their respective computer systems, or implemented within software modules (or computer programs) executed by one or more general purpose computers. Moreover, process steps described as being performed by a "marketplace," a "vendor," a "fulfillment center" or a "customer" may be typically performed by a human operator, but could, alternatively, be performed by an automated agent.

The marketplace 210, the vendor 220, the fulfillment center 230 and/or the customer 260 may use any web-enabled or Internet applications or features, or any other client-server applications or features including electronic mail (or E-mail), or other messaging techniques, to connect to the network 270 or to communicate with one another, such as through short or multimedia messaging service (SMS or MMS) text messages. For example, the fulfillment center 230 and/or the desktop computer 232 may be adapted to transmit information or data in the form of synchronous or asynchronous messages to the server 212, the laptop computer 222, the smartphone 262 or any other computer device in real time or in near-real time, or in one or more offline processes, via the network 270. Those of ordinary skill in the pertinent art would recognize that the marketplace 210, the vendor 220, the fulfillment center 230 or the customer 260 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the server 212, the laptop computer 222, the desktop computer 232 or the smartphone 262, or any other computers or control systems utilized by the marketplace 210, the vendor 220, the fulfillment center 230 or the customer 260 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

As is discussed above, the systems and methods of the present disclosure are directed to defining a signature or a pattern of one or more identifiers shown in an image of an object, and comparing the defined signature or pattern to information regarding one or more previously observed signatures or patterns of identifiers, which includes locations or positions of recognizable characters within or associated with such signatures or patterns. If the defined signature or pattern is consistent with a selected one of the previously observed signatures or patterns, then the portions within or associated with the defined signature or pattern that are consistent with the locations or positions of recognizable characters within or associated with the selected previously observed signature or pattern may be evaluated according to one or more OCR techniques. Therefore, according to the systems and methods of the present disclosure, recognizable characters on an object as expressed in an image may be interpreted by determining an orientation of the object within the image, and evaluating specific, limited regions of the image, guided by signatures or patterns of identifiers on the object within the image, rather than the entire image.

Figure 3:
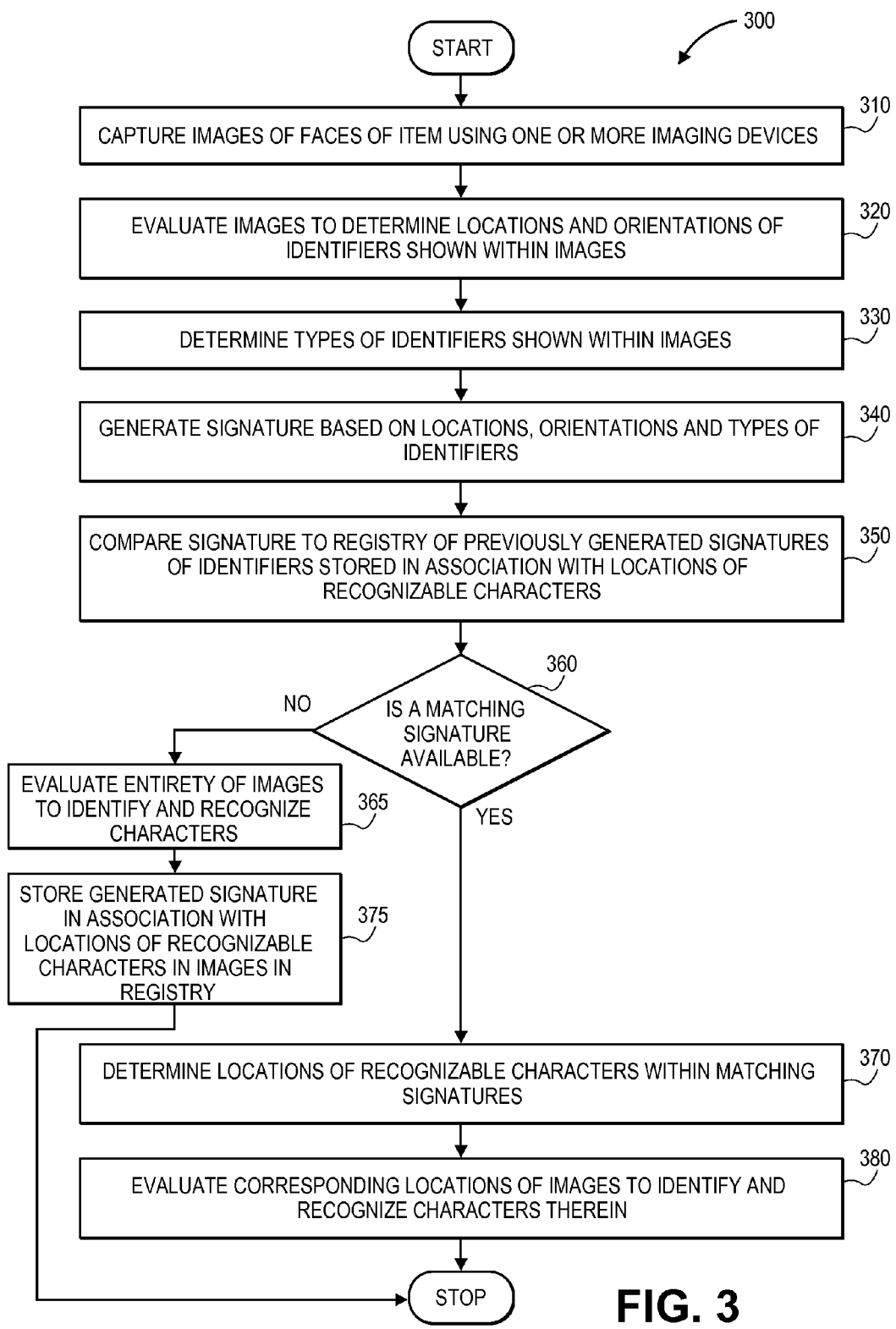
FIG. 3 is a flow chart of one process for signature-guided character recognition, in accordance with embodiments of the present disclosure.

Referring to FIG. 3, a flow chart 300 representing one embodiment of a process for signature-guided character recognition in accordance with embodiments of the present disclosure is shown. At box 310, images of surface or faces of an item are captured using one or more imaging devices. For example, referring again to the system 100 of FIG. 1A, the cameras 140 may be configured to capture images of surfaces or faces of items, such as the item 10, as the items travel along the conveyor system 136. At box 320, the images captured at box 310 may be evaluated in order to determine locations and orientations of identifiers (e.g., one-dimensional bar codes, two-dimensional bar codes, characters of various fonts or sizes, or other recognizable markings) represented within such images. The locations and orientations of identifiers may be identified by any known means or method, and may be expressed in absolute or relative terms, such as coordinates.

At box 330, the types of identifiers shown within the images are determined. For example, an identifier may be generally recognized as a one-dimensional bar code, a two-dimensional bar code, a character of a specific font or size, or any other type or form of identifier that may be recognized within an image. Alternatively, an identifier may be identified as a specific type of one-dimensional bar code (e.g., a Code 39 code, an EAN code, a CodaBar code, a Code 128 code, a UPC-A code, or a channel code), two-dimensional bar code (e.g., a QR code, a Code 16K code, a MaxiCode, a Data Matrix, a PDF 417 or an Aztec Code) or one or more specific characters (e.g., the letter "A," the phrases "THIS END UP" or "FRAGILE," or a serial number or shipping number).

At box 340, a signature may be generated based on the locations, orientations and types of identifiers shown in the images. Such a signature (or pattern) of the identifiers within the image may be defined according to the relationships between one another. At box 350, the signature generated at box 340 is compared to a registry of previously generated signatures of identifiers that are stored in association with locations of recognizable characters. For example, a registry maintained in a database or other data store may include coordinates or other references to locations of groups of identifiers that were previously observed within images, or the identifiers' respective orientations, as well as locations of recognizable characters with respect to such identifiers, or any other relevant data.

At box 360, whether a matching signature is available within the registry is determined. If a matching signature is available, then the process advances to box 370, where the locations of recognizable characters within the matching signature are determined, and to box 380, where corresponding locations of the images captured at box 310 are evaluated in order to identify and recognize the characters therein. If the matching signature in the registry is observed to include a set of characters (e.g., text, numbers or symbols) one half inch above a one-dimensional bar code and one-quarter inch to the right of a two-dimensional bar code, then portions of the images captured at box 310 that are one-half inch above one-dimensional bar codes and one-quarter inch to the right of two-dimensional bar codes may be evaluated according to one or more OCR techniques in order to identify and recognize any characters within such portions alone, rather than the entirety of such images. For example, where images of a crate of bananas are captured at box 310, a trademark or other symbol having text thereon may be evaluated and specific portions of the crate within the image may be evaluated in order to identify an expiration date of the bananas.

However, if no matching signature is available in the registry at box 360, then the process advances to box 365, where the images are evaluated in their entirety in order to identify and recognize any characters therein, and to box 375, where the signature generated at box 340 is stored in association with the locations of the recognizable characters in such images in the registry. For example, where the signature generated at box 340 has not previously been encountered, or where information regarding locations of characters associated with the generated signature is not available in the registry, the generated signature and such locations may be stored in the registry, and made available when localizing characters once the generated signature is encountered in the future. The locations of such characters may be determined using any form of learning tools, algorithms or techniques (e.g., machine-learning tools), including but not limited to frequentist methods (e.g., raw countings of occurrences of specific combinations of identifiers and locations of text, numbers or symbols), or one or more statistical methods, such as log likelihood methods, artificial neural networks, latent Dirichlet allocations, K-means clustering or other like techniques, and in one or more online or offline processes, and in real time, in near-real time, as well as in one or more batch functions. Furthermore, the content (e.g., sectors, regions or portions) of the images may be evaluated in any manner, including in a predetermined order, e.g., from left-to-right, or from top-to-bottom, in a random order, or based on an estimated probability that such content will include recognizable characters, and according to any type or form of text detection or localization algorithm or technique.

Figure 4A:
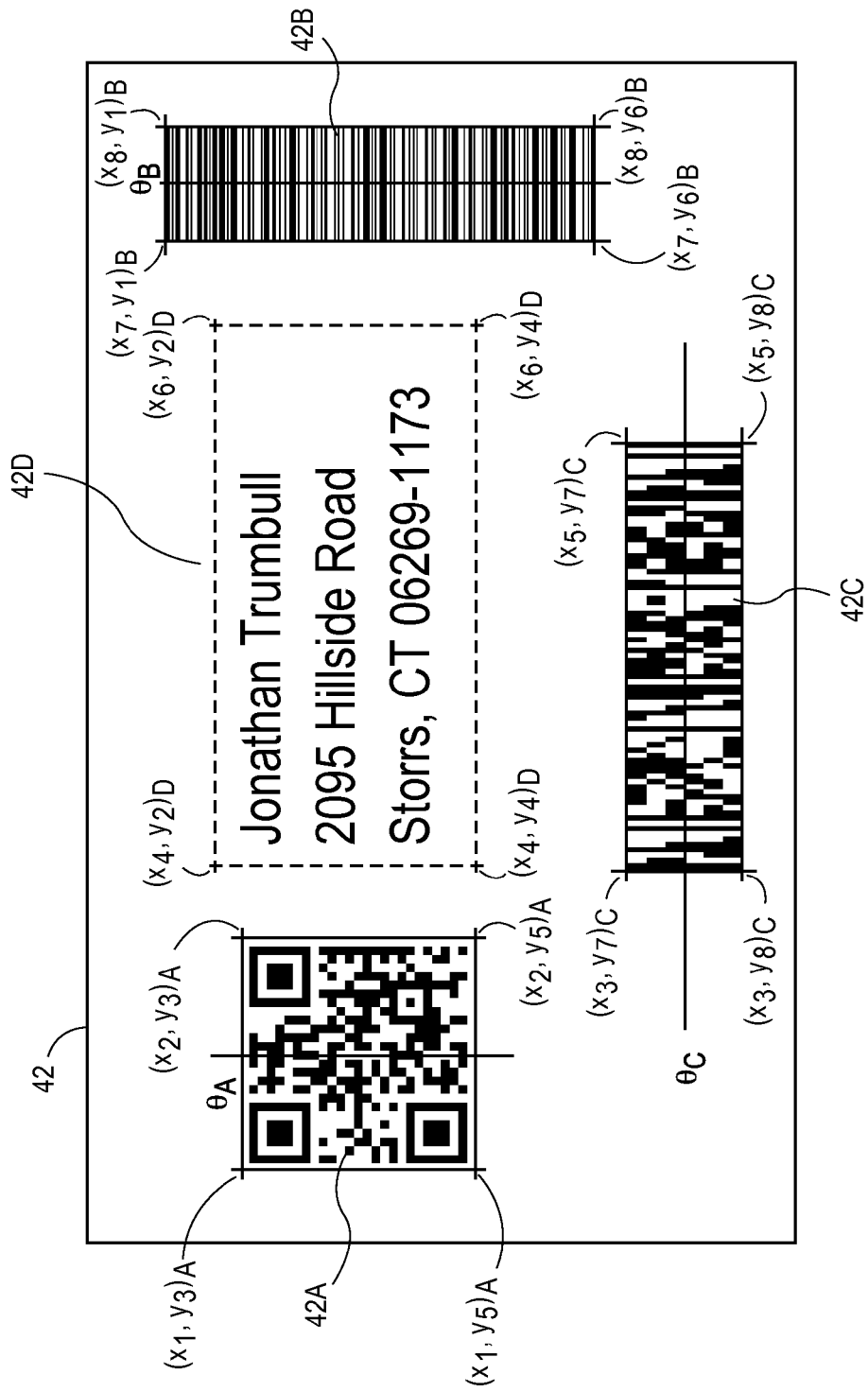
FIGS. 4A and 4B are views of aspects of one system for signature-guided character recognition, in accordance with embodiments of the present disclosure.
Figure 4B:
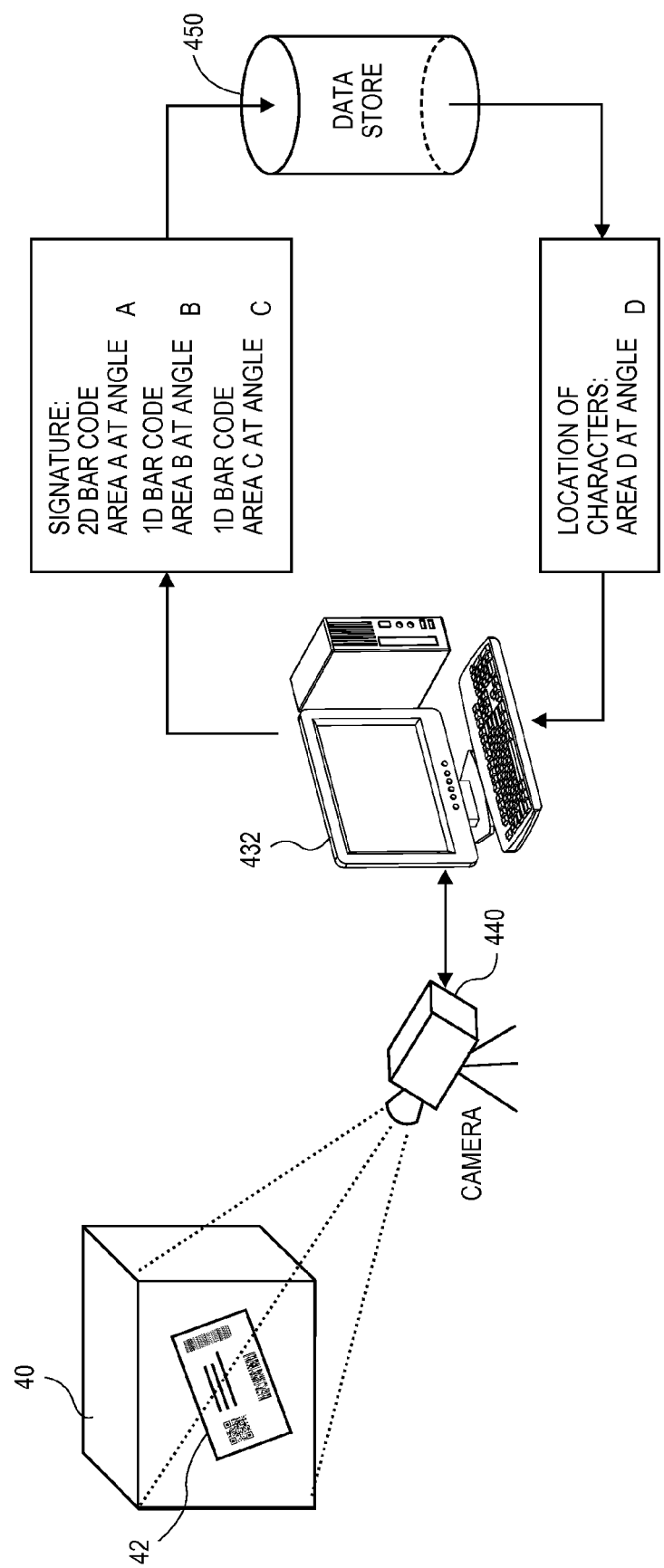

The determination of types, locations and orientations of identifiers, as well as the generation of signatures based on such identifiers, is shown with regard to FIGS. 4A and 4B. Referring to FIG. 4A, a label 42 including a plurality of identifiers 42A, 42B, 42C and a set of recognizable characters 42D is shown. Except where otherwise noted, reference numerals beginning with the number "4" in FIG. 4A or FIG. 4B refer to similar elements having reference numerals beginning with the number "1" in FIG. 1A or FIG. 1B.

As is shown in FIG. 4A, the identifier 42A is a two-dimensional bar code (viz., a QR bar code) having a substantially square shape defined by coordinate points $(x_1, y_3)_A$, $(x_2, y_3)_A$, $(x_1, y_5)_A$, $(x_2, y_5)_A$, and a substantially vertical angle of orientation $\theta_A$. Similarly, the identifier 42B is a one-dimensional bar code (viz., a Code 128 bar code) having a substantially rectangular shape defined by coordinate points $(x_7, y_1)_B$, $(x_8, y_1)_B$, $(x_7, y_6)_B$, $(x_8, y_6)_B$, and a substantially vertical angle of orientation $\theta_B$, while the identifier 42C is a two-dimensional bar code (viz., a PDF417 bar code) having a substantially rectangular shape defined by coordinate points $(x_3, y_7)_C$, $(x_5, y_7)_C$, $(x_3, y_8)_C$, $(x_5, y_8)_C$, and a substantially horizontal angle of orientation $\theta_C$. Accordingly, for the label 42 of FIG. 4A, a signature or pattern may be generated based on the locations and angles of orientation of the identifiers 42A, 42B, 42C. Those of ordinary skill in the pertinent art will recognize that any type of identifier, or arrangement of identifiers, may be used to define signatures or to identify locations of characters corresponding with such signatures.

According to one or more systems and methods of the present disclosure, the signature generated based on the locations and angles of orientation of the identifiers 42A, 42B, 42C of FIG. 4A may be compared to a registry or record maintained in a data store that includes information regarding not only other signatures or patterns of identifiers that were previously observed or are known to exist but also locations of characters (e.g., text, numbers and/or symbols) that may be associated with such signatures or patterns. Referring to FIG. 4B, a camera 440 capturing an image of a surface or face of an object 40 having the label 42 of FIG. 4A disposed thereon is shown. As is discussed above, the camera 440 may capture an image of the label 42 and determine not only the types of identifiers 42A, 42B, 42C included on the label 42 but also the locations and orientations of the identifiers 42A, 42B, 42C.

Once such types, locations and orientations are determined, a signature or pattern defined based on the identifiers may be compared to a registry or record of such signatures or patterns maintained in the data store 450, and a location of recognizable characters associated with the signature or pattern may be determined and returned to the camera 440. A corresponding location within or adjacent to the signature or pattern defined based on the identifiers 42A, 42B, 42C may then be evaluated in order to locate and interpret any recognizable characters set forth therein. For example, referring again to FIG. 4A, if a signature defined based on the identifiers 42A, 42B, 42C has been previously observed to include recognizable characters within the region defined by coordinate points $(x_4, y_2)_D$, $(x_4, y_4)_D$, $(x_6, y_2)_D$, $(x_6, y_4)_D$ with respect to the locations and orientations of the identifiers 42A, 42B, 42C, then the camera 440 may be configured to evaluate a corresponding region of the label 42, and to interpret any text, numbers or symbols included therein.

Figure 5:
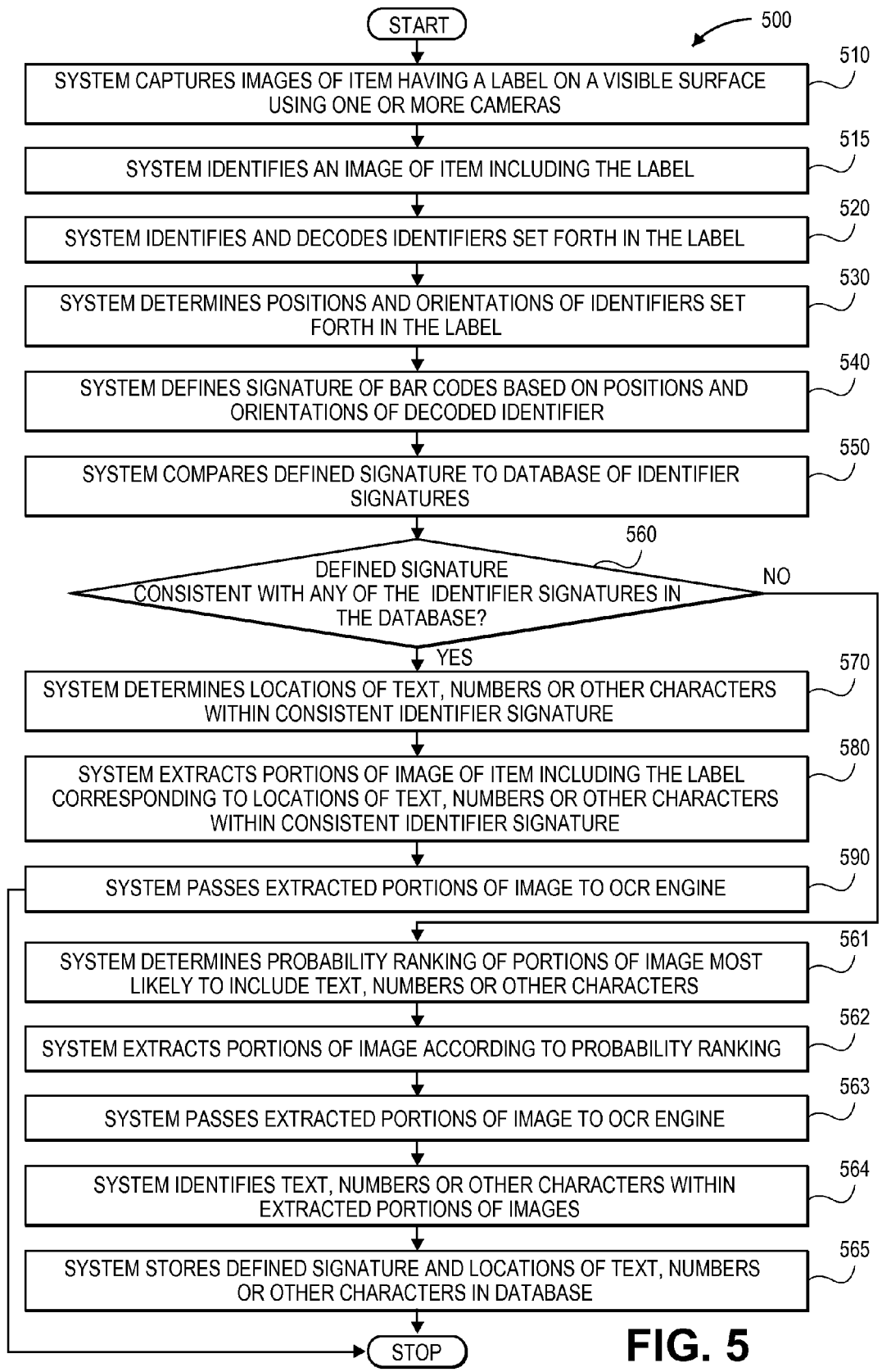
FIG. 5 is a flow chart of one process for signature-guided character recognition, in accordance with embodiments of the present disclosure.

As is discussed above, where an image having an observed signature or pattern of identifiers (e.g., bar codes or characters) and recognizable characters associated therewith has been previously encountered, or where information regarding locations of such characters with respect to the observed signature or pattern is available, efforts to automatically guide the evaluation of the image to locate and interpret (e.g., by way of one or more OCR techniques) may be directed to specific locations within the image where such characters have been previously observed with respect to the signature or pattern. However, if the observed signature or pattern of identifiers within an image has not been previously encountered, or if information regarding the locations of recognizable characters with respect to the observed signature or pattern is not available, then the image may be evaluated in its entirety, beginning first with portions or regions of the image where recognizable characters are most likely to be found. Referring to FIG. 5, a flow chart 500 representing one embodiment of a process for signature-guided character recognition in accordance with embodiments of the present disclosure is shown. Except where otherwise noted, reference numerals beginning with the number "5" in FIG. 5 refer to similar elements having reference numerals beginning with the number "3" in FIG. 3.

At box 510, a system captures images of an item having a label on a visible surface thereof, using one or more digital cameras or other imaging devices. For example, referring again to the system 100 of FIG. 1A, one or more cameras 140 may be configured to capture images of objects from various perspectives and within various fields of view. At box 515, the system identifies an image of the item that includes the label. For example, the system may recognize one or more edges, contours or outlines of the label within the image, or any colors (e.g., black and white, or high-visibility colors such as blaze orange) or other features within the image that are commonly associated with labels.

At box 520, the system identifies and decodes one or more bar codes set forth in the label in the image identified at box 515. For example, the system may identify sequences of white or light-colored shapes or lines and black or dark-colored shapes or lines within the label, and identify one or more representations of data (e.g., sets of alphanumeric characters) associated with such sequences. At box 530, the system determines positions and orientations of the bar codes set forth in the label. For example, referring again to FIG. 1B, the system may identify the positions $(x_A, y_A)$, $(x_B, y_B)$ and $(x_C, y_C)$ and angles of orientation $\theta_A$, $\theta_B$, $\theta_C$ of the identifiers 12A, 12B, 12C on the label 12 within the image of the item 10.

At box 540, the system determines a signature associated with the bar codes based on their positions and orientations in the label. For example, referring again to FIG. 4A, the system may define a signature based on the positions and orientations of the identifiers 42A, 42B, 42C, as represented by the coordinates $(x_i, y_i)$ and/or angles of orientation $\theta_i$. The signature may be defined in any manner or according to any standard, and may represent the absolute or actual distance or relation between the one or more bar codes of the signature. At box 550, the system compares the defined signature to a database of bar code signatures. For example, referring again to the system 100 of FIG. 1A, information regarding the signature defined based on the bar codes on the label 12 may be compared to information regarding the signatures 152, 154, 156, 158 stored in the data store 150.

At box 560, the system determines whether the signature is consistent with any of the bar code signatures stored in the database. If the defined signature is consistent with one of the bar code signatures stored in the database, then the process advances to box 570, where the system determines the locations of text, numbers or other characters within the consistent bar code signature in the database. For example, where a registry or other record maintained in the database includes not only information regarding a plurality of signatures or patterns of bar codes that were previously observed within one or more images but also information regarding locations of alphanumeric characters or other symbols within a vicinity of such signatures or patterns in such images, the system may determine where such characters or symbols are typically located in absolute terms, or with respect to the locations or orientations of the bar codes.

At box 580, the system extracts portions of the image of the item including the label that correspond to the locations of the text, the numbers or the other characters within the consistent bar code signature. For example, where information regarding a bar code signature identified in the database also indicates that a set of valuable and important text is frequently displayed above a Code 16K two-dimensional bar code and to the left of a UPC-A code, then the corresponding portions of an image of the item including a consistent signature are extracted therefrom. At box 590, the system passes the extracted portions of the image to an OCR engine for interpretation, and the process ends.

However, if the defined signature is not consistent with any of the bar code signatures stored in the database, then the process advances to box 561, where the system determines a probability ranking of the various portions of the image that are most likely to include text, numbers or other characters. For example, even if a label which includes a CodaBar bar code has not previously been encountered by the system, or where information regarding the label is not available in the database, if labels including CodaBar bar codes have frequently included alphanumeric characters within one eighth of an inch below the bar codes in other labels, then a corresponding portion of a label that includes a CodaBar bar code may be deemed likely to include alphanumeric characters, and a probability ranking of such a portion may be defined accordingly. Similarly, where a region to the right of a Data Matrix code is known to infrequently include any text within a proximity thereof, then corresponding portions of labels including Data Matrix codes may be deemed unlikely to include alphanumeric characters, and a probability ranking of such portions may be defined accordingly. Moreover, the probability that a portion of an image includes alphanumeric characters need not be defined with reference to any one particular identifier; for example, many shipping labels frequently include information regarding an origin of an item to which the label is affixed (e.g., a name of a sender and his or her address) in an upper left corner thereof, while information regarding a destination for the item (e.g., a name of a recipient and his or her address) is frequently printed in a central portion of the label.

At box 562, the system extracts portions of the image according to the probability rankings defined at box 561, and at box 563, the system passes extracted portions of the image to an OCR engine for further analysis. For example, where the probability ranking defined at box 561 ranks various portions of an image in an order based on the likelihood that such portions include recognizable characters therein, from most probable to least probable, the highest-ranking portions of the image may be extracted and passed to the OCR engine first, followed by the next-highest ranking portions, and so on and so forth. At box 564, the system identifies text, numbers or other characters within the extracted portions of the images, and at box 565, the system stores information regarding the defined signature and the locations where the text, the numbers or the other characters were found within the extracted portions in the database. For example, an association between the defined signature and such locations may be stored in the database for future consideration where items bearing labels having bar codes set forth therein are encountered, and where signatures of such bar codes are defined based on their respective positions and orientations.

Figure 6A:
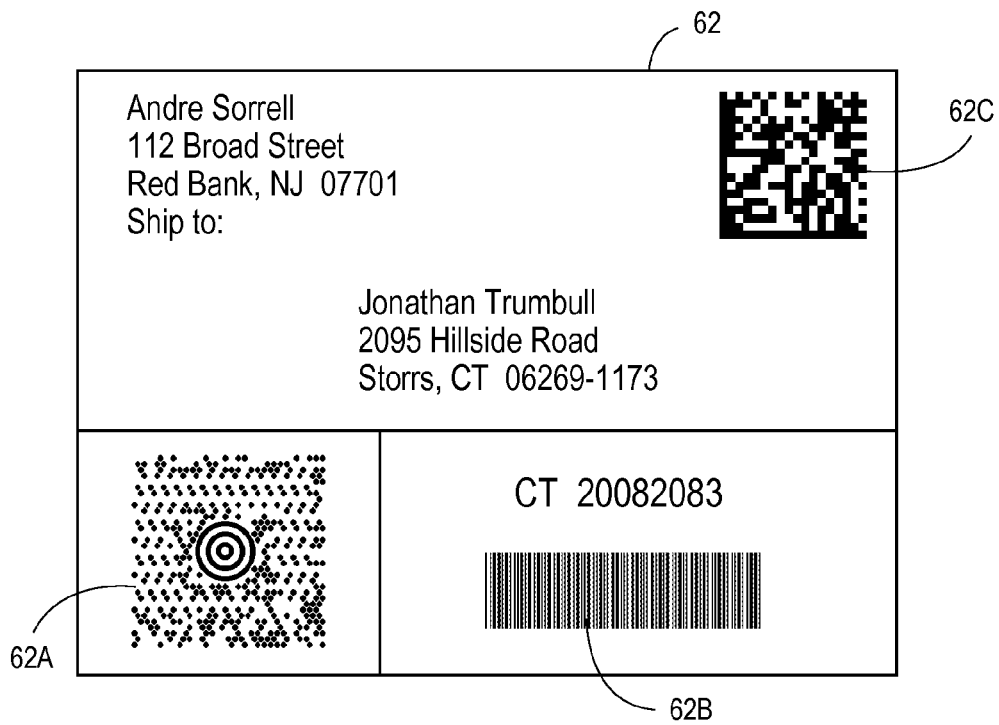
FIGS. 6A and 6B are views of aspects of one system for signature-guided character recognition, in accordance with embodiments of the present disclosure.
Figure 6B:
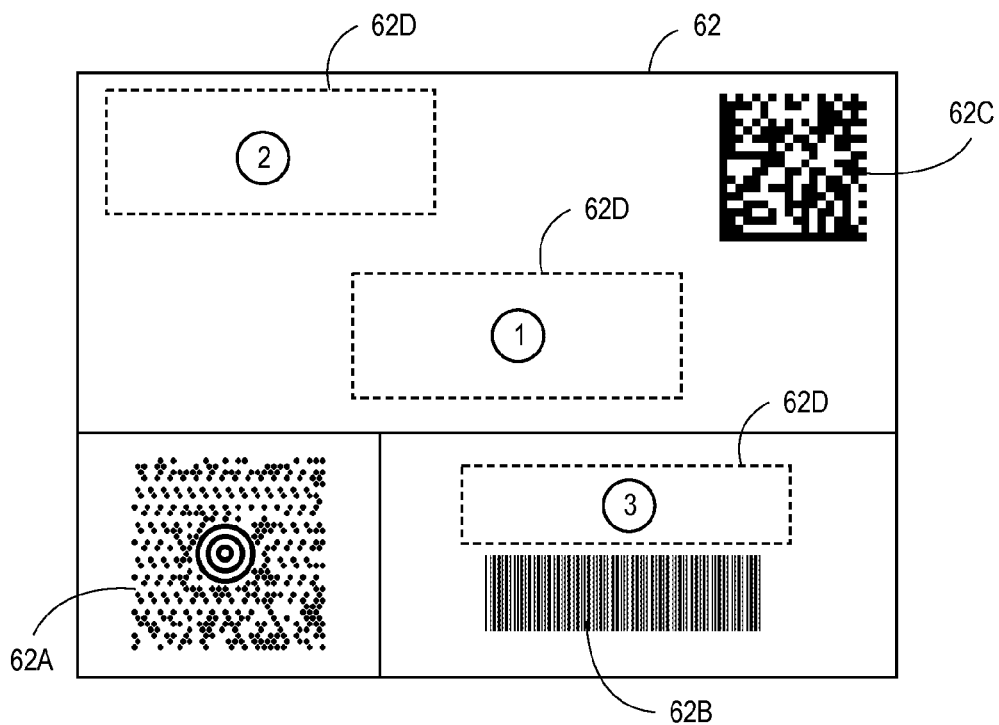

The evaluation of an image of a label including identifiers in a signature or pattern that has not previously been encountered, or for which sufficient information regarding locations of recognizable characters is not available, may be shown with regard to FIGS. 6A and 6B. Referring to FIGS. 6A and 6B, a label 62 having a plurality of identifiers 62A, 62B, 62C included therein is shown. Except where otherwise noted, reference numerals beginning with the number "6" in FIG. 6A or FIG. 6B refer to similar elements having reference numerals beginning with the number "4" in FIG. 4A or FIG. 4B, or with the number "1" in FIG. 1A or FIG. 1B.

As is shown in FIG. 6A, the label 62 includes the plurality of identifiers 62A, 62B, 62C in discrete locations. The identifier 62A is a MaxiCode two-dimensional bar code disposed in a lower left corner region of the label 62, while the identifier 62B is a Code 39 one-dimensional bar code disposed along a lower central portion of the label 62, and the identifier 62C is a Data Matrix two-dimensional bar code disposed in an upper right corner region of the label 62. Moreover, the label 62 of FIG. 6A includes a set of characters in an upper left portion of the label 62, a set of characters in a central portion of the label 62, and a set of characters in a lower right portion of the label above the identifier 62B.

As is discussed above, when a signature or pattern that is defined based on the locations and/or orientations of such identifiers has not previously been encountered by a system for signature-guided character recognition in accordance with the present disclosure, or information regarding the signature or pattern and locations of sets of text, numbers or symbols associated with the signature or pattern is not available, the regions in a vicinity of the signature or pattern that have the highest probabilities or likelihoods of including sets of text, numbers or symbols may be evaluated first, with such probabilities or likelihoods determined based on prior experience with identifiers of the same type or form, or on any other factor. Referring to FIG. 6B, the label 62 of FIG. 6A is shown, along with the portions 62D having the highest probability of including recognizable characters therein. For example, a central region of many labels, such as the label 62, frequently includes information regarding an intended recipient of an item to which the label 62 is affixed (e.g., a destination for the item). Therefore, a central region 62D of the label 62 may be deemed most likely to include text, numbers or other symbols therein. Similarly, an upper left region of many labels, such as the label 62, frequently includes information regarding a source or origin of an item to which the label 62 is affixed (e.g., a sender of the item). Therefore, such a region 62D of the label 62 may be deemed likely to include text, numbers or other symbols therein. Finally, even where a particular signature of identifiers has not previously been encountered, or where information regarding the locations of recognizable characters associated with such a signature is not available, other experiences or information regarding one or more specific identifiers may serve as a basis for defining a probability that recognizable characters may be found in a specific location, such as the region 62D above the identifier 62B.

Accordingly, the systems and methods of the present disclosure may define a signature or a pattern based on the locations or orientations of identifiers within an image, and compare the signature or pattern to information regarding signatures or patterns that is maintained in a database or other data store, along with information regarding locations of text, numbers or other characters associated with such signatures or patterns. If information regarding the defined signature or pattern is not available in the database or data store, then the image may be analyzed to locate and recognize any characters that may be included therein according to a probability or likelihood that such portions include recognizable characters. Such probabilities or likelihoods may be determined on any basis.

Although the present disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. For example, although some of the embodiments discussed herein are described as operating in a fulfillment center environment, the systems and methods of the present disclosure are not so limited, and may be utilized in any scenario or situation in which the recognition of characters within images is required. Furthermore, although many of the embodiments disclosed herein refer to identifiers that are printed in the form of labels affixed to or disposed upon objects, the systems and methods of the present disclosure are also not so limited, and may be used in connection with characters that are printed, stamped, marked or written upon such objects. Additionally, although some of the embodiments disclosed herein are described as including a single imaging device, e.g., a single digital camera, the systems and methods of the present disclosure are not so limited, and may utilize any number of imaging devices (e.g., two or more) imaging devices.

Furthermore, although some of the identifiers disclosed herein are shown as being or including bar codes (e.g., one-dimensional or two-dimensional bar codes), the systems and methods of the present disclosure are not so limited, and may be used to generate signatures or patterns of identifiers of any type or form, including one or more sets of text, numbers, symbols or other characters of any font, size or form. Additionally, a "signature" or "pattern" of such identifiers is not limited to a single surface or face of an object, and may span across multiple surfaces or faces of an object that include such identifiers.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIGS. 3 and 5, the order in which the boxes or steps of the methods or processes are listed is not intended to be construed as a limitation on the claimed inventions, and any number of the boxes or steps can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or boxes or steps. In a similar manner, terms such as "include," "including" and "includes are generally intended to mean "including, but not limited to." Thus, such conditional language is not generally intended to imply that features, elements and/or boxes or steps are in any way required for one or more embodiments or that one or more embodiments necessarily include logic for deciding, with or without user input or prompting, whether these features, elements and/or boxes or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A character recognition system comprising:
    a digital camera; and
    a computing device in communication with the digital camera,
    wherein the computing device is configured to at least:
        capture at least one image of at least two faces of an object using the digital camera;
        identify a plurality of identifiers within the at least one image, wherein the plurality of identifiers comprises a first identifier provided on a first face of the object and a second identifier provided on a second face of the object;
        determine a position of the first identifier on the first face of the object based at least in part on the at least one image;
        determine a position of the second identifier on the second face of the object based at least in part on the at least one image;
        determine an orientation of the first identifier on the first face of the object based at least in part on the at least one image;
        determine an orientation of the second identifier on the second face of the object based at least in part on the at least one image;
        define a signature based at least in part on the position of the first identifier on the first face, the orientation of the first identifier on the first face, the position of the second identifier on the second face and the orientation of the second identifier on the second face within the at least one image;
        determine whether information regarding a position of recognizable characters associated with the defined signature is included in a data store; and
        upon determining that information regarding the position of recognizable characters on at least one of the at least two faces of the object associated with the defined signature is included in the data store,
            extract a portion of the at least one image corresponding to the position of recognizable characters on at least one of the at least two faces of the object associated with the defined signature; and
            evaluate the portion of the at least one image according to a character recognition analysis.

2. The character recognition system of claim 1, wherein the computing device is further configured to at least:
    upon determining that information regarding the position of recognizable characters associated with the defined signature is not included in the data store,
        evaluate the at least one image according to a character recognition analysis;
        determine a position of at least one recognizable character on at least one of the at least two faces of the object within the at least one image; and
        store an association of the defined signature and the position of the at least one recognizable character on the at least one of the at least two faces of the object in the data store.

3. The character recognition system of claim 1, further comprising a conveyor device for transporting objects,
    wherein the computing device is further configured to at least:
        capture the at least one image of the at least two faces of the object using the digital camera while the object is transported by the conveyor device.

4. The character recognition system of claim 1, wherein at least one of the plurality of identifiers is one of:
    a one-dimensional bar code;
    a two-dimensional bar code;
    a bokode;
    a set of characters; or
    a symbol.

5. A method comprising:
    capturing at least one image of at least a first face and at least a second face of an object using at least one imaging device;
    identifying at least a first identifier on the first face within the at least one image using at least one computer processor;
    identifying at least a second identifier on the second face within the at least one image using the at least one computer processor;
    determining a first location of the first identifier on the first face within the at least one image using the at least one computer processor;
    determining a second location of the second identifier on the second face within the at least one image using the at least one computer processor;
    determining a first orientation of the first identifier on the first face within the at least one image using the at least one computer processor;
    determining a second orientation of the second identifier on the second face within the at least one image using the at least one computer processor;
    defining a signature based at least in part on the first location, the second location, the first orientation and the second orientation using the at least one computer processor;
    selecting at least a portion of the at least one image for evaluation based at least in part on the defined signature, wherein the selected portion comprises at least some of the first face or at least some of the second face; and
    evaluating the selected portion of the at least one image using the at least one computer processor.

6. The method of claim 5, wherein selecting at least the portion of the at least one image of the object based at least in part on the defined signature comprises:
    determining whether information regarding the defined signature corresponds with information regarding one of a plurality of signatures stored in a data store,
    wherein the information regarding the one of the plurality of signatures comprises a location of recognizable characters associated with the one of the plurality of signatures.

7. The method of claim 6, wherein selecting at least the portion of the at least one image for evaluation based at least in part on the defined signature further comprises:
    in response to determining that the information regarding the defined signature corresponds with the information regarding the one of the plurality of signatures stored in the data store, selecting at least the portion of the at least one image for evaluation based at least in part on the location of the recognizable characters associated with the one of the plurality of signatures.

8. The method of claim 6, wherein selecting at least the portion of the at least one image for evaluation based at least in part on the defined signature further comprises:
   in response to determining that the information regarding the defined signature does not correspond with the information regarding the one of the plurality of signatures stored in the data store,
     selecting an entirety of the at least one image for evaluation.

9. The method of claim 6, wherein selecting at least the portion of the at least one image for evaluation based at least in part on the defined signature further comprises:
   in response to determining that the information regarding the defined signature does not correspond with the information regarding the one of the plurality of signatures stored in the data store,
   determining, for each of a plurality of portions of the at least one image, a probability that the portion of the at least one image comprises at least one recognizable character; and
   selecting at least the portion of the at least one image for evaluation based at least in part on the probability.

10. The method of claim 6, wherein the data store comprises locations of recognizable characters associated with the plurality of signatures.

11. The method of claim 5, wherein defining the signature based at least in part on the first location, the second location, the first orientation and the second orientation comprises:
   generating a data record comprising information regarding the first location and the first orientation of the first identifier and the second location and the second orientation of the second identifier, and
   wherein selecting at least the portion of the image for evaluation based at least in part on the defined signature comprises:
   comparing the data record to a plurality of data records, wherein the data records comprise information regarding locations and orientations of identifiers and corresponding locations of recognizable characters associated with the identifiers; and
   selecting at least the portion of the image for evaluation based at least in part on one of the plurality of data records.

12. The method of claim 11, wherein the data record comprises information regarding the first location of the first identifier and the second location of the second identifier within the image expressed according to a coordinate system and information regarding a first angle of the first orientation of the first identifier and a second angle of the second orientation of the second identifier with respect to the image.

13. The method of claim 5, wherein the selected portion of the at least one image is evaluated according to a character recognition technique, and
   wherein the method further comprises:
   identifying a plurality of characters within the selected portion of the at least one image according to the character recognition technique.

14. The method of claim 5, wherein evaluating the selected portion of the at least one image comprises:
   extracting the selected portion of the at least one image;
   transmitting the selected portion of the at least one image to at least one server over a network; and
   receiving information regarding a plurality of characters expressed within the selected portion of the at least one image from the at least one server over the network.

15. The method of claim 5, wherein at least one of the first identifier or the second identifier is one of:
   a one-dimensional bar code;
   a two-dimensional bar code;
   a bokode;
   a set of characters; or
   a symbol.

16. The method of claim 5, wherein the first identifier is included within a first label disposed upon the first face of the object, and
   wherein the second identifier is included within a second label disposed upon the second face of the object.

17. The method of claim 5, further comprising:
   interpreting at least one of the first identifier or the second identifier,
   wherein the signature is defined based at least in part on the interpreted first identifier or the interpreted second identifier.

18. A non-transitory computer-readable medium having instructions that, when executed by a computer processing device, cause the computer processing device to perform a method comprising:
   identifying an image of a product bearing a first label on a first face of the product and a second label on a second face of the product, wherein the first label includes a first plurality of bar codes and wherein the second label includes a second plurality of bar codes;
   determining a position of each of the first plurality of bar codes within the first label;
   determining a position of each of the second plurality of bar codes within the second label;
   determining an angle of orientation of each of the first plurality of bar codes within the first label;
   determining an angle of orientation of each of the second plurality of bar codes within the second label;
   determining a type of each of the first plurality of bar codes within the first label;
   determining a type of each of the second plurality of bar codes within the second label;
   defining a signature based at least in part on the positions of each of the first plurality of bar codes within the first label, the angles of orientation of each of the first plurality of bar codes within the first label, the types of each of the first plurality of bar codes within the first label, the positions of each of the second plurality of bar codes within the second label, the angles of orientation of each of the second plurality of bar codes within the second label and the types of each of the second plurality of bar codes within the second label;
   determining whether information regarding a position of recognizable characters associated with the signature is available in at least one data store; and
   in response to determining that information regarding the position of the recognizable characters associated with the signature is available in the at least one data store,
   identifying the position of the recognizable characters associated with the signature in one of the first label or the second label based at least in part on the information regarding the position of the recognizable characters associated with the signature is being available in the at least one data store.

19. The non-transitory computer-readable medium of claim 18, wherein the method further comprises:

performing a character recognition analysis of a portion of the image corresponding to the position of the recognizable characters associated with the signature in the one of the first label or the second label; and recognizing the recognizable characters within the portion of the image based at least in part on the character recognition analysis.

20. The non-transitory computer-readable medium of claim 18, wherein the method further comprises:

in response to determining that information regarding the position of the recognizable characters associated with the signature is not available in the at least one data store, performing a character recognition analysis of the image in its entirety;

determining a position of recognizable characters in one of the first label or the second label within the image; and storing an association of the signature and the position of the recognizable characters in the one of the first label or the second label in the at least one data store.

21. The non-transitory computer-readable medium of claim 20, wherein performing the character recognition analysis of the image in its entirety comprises:

identifying a plurality of portions of the image;

determining a probability ranking of the portions of the image;

determining an order of the portions based at least in part on the probability rankings; and performing the character recognition analysis of the portions of the image in the order.

* * * * *